United States Patent
Westgarth

(10) Patent No.: US 10,473,132 B2
(45) Date of Patent: Nov. 12, 2019

(54) LOCKED CONNECTIONS BETWEEN TWO THREADED MEMBERS

(71) Applicant: National Oilwell Varco UK Limited, Manchester (GB)

(72) Inventor: Richard Matthew Westgarth, Ouston (GB)

(73) Assignee: NATIONAL OILWELL VARCO UK LIMITED, Manchester (GB)

( * ) Notice: Subject to any disclaimer, the term of this patent is extended or adjusted under 35 U.S.C. 154(b) by 217 days.

(21) Appl. No.: 15/625,220

(22) Filed: Jun. 16, 2017

(65) Prior Publication Data

US 2018/0363688 A1 Dec. 20, 2018

(51) Int. Cl.
*F16L 15/08* (2006.01)
*F16B 7/18* (2006.01)
*F16B 21/16* (2006.01)

(52) U.S. Cl.
CPC .............. *F16B 7/18* (2013.01); *F16B 21/16* (2013.01); *F16L 15/08* (2013.01)

(58) Field of Classification Search
CPC ...... E21B 17/043; E21B 17/046; F16B 21/16; F16L 15/08; F16L 19/025
See application file for complete search history.

(56) References Cited

U.S. PATENT DOCUMENTS

| | | | | |
|---|---|---|---|---|
| 4,512,596 A * | 4/1985 | Obrecht | ................ | E21B 17/043 285/81 |
| 4,610,465 A * | 9/1986 | Boyadjieff | .............. | E02B 17/00 285/18 |
| 4,655,482 A * | 4/1987 | Myers | ................... | F16L 19/005 285/305 |
| 7,887,098 B2 * | 2/2011 | Aas | ........................ | F16L 15/08 285/391 |
| 8,690,200 B1 * | 4/2014 | Patterson, Jr. | .......... | E21B 17/08 285/403 |
| 2005/0279513 A1 * | 12/2005 | Eppink | ................... | E21B 17/10 166/380 |

(Continued)

FOREIGN PATENT DOCUMENTS

| WO | 2005/026494 A1 | 3/2005 |
|---|---|---|
| WO | 2016/205262 A1 | 12/2016 |

OTHER PUBLICATIONS

PCT/US2018/037702 International Search Report and Written Opinion dated Sep. 24, 2018 (14 p.).

*Primary Examiner* — Daniel J Wiley
(74) *Attorney, Agent, or Firm* — Conley Rose, P.C.

(57) ABSTRACT

Apparatus for coupling first and second tubular members includes a first ring coupled to the first tubular member and having a castellated annular first surface with teeth extending in a first direction, and having a projecting tab extending in a second direction opposite the first. The tab is received in a recess in the first tubular member and has a beveled surface. A key is configured to be disposed in the first recess, and has a beveled surface that engages the beveled surface of the tab. A through-bore in the key is aligned with a fastener-receiving bore in the first tubular member and a fastener is disposed in the aligned bores. A second castellated annular surface coupled to the second tubular member has teeth meshing with the teeth of the first castellated annual surface.

19 Claims, 7 Drawing Sheets

(56) References Cited

U.S. PATENT DOCUMENTS

| | | | |
|---|---|---|---|
| 2006/0267342 A1* | 11/2006 | Boyd | E21B 17/04 285/333 |
| 2007/0063513 A1* | 3/2007 | Boyd | E21B 17/04 285/355 |
| 2011/0127768 A1* | 6/2011 | Elrick | E21B 17/046 285/333 |
| 2014/0167408 A1* | 6/2014 | Steen | F16L 15/08 285/330 |
| 2016/0369920 A1* | 12/2016 | Pallini, Jr. | F16L 15/06 |
| 2017/0101828 A1* | 4/2017 | McGowan | E21B 17/043 |

* cited by examiner

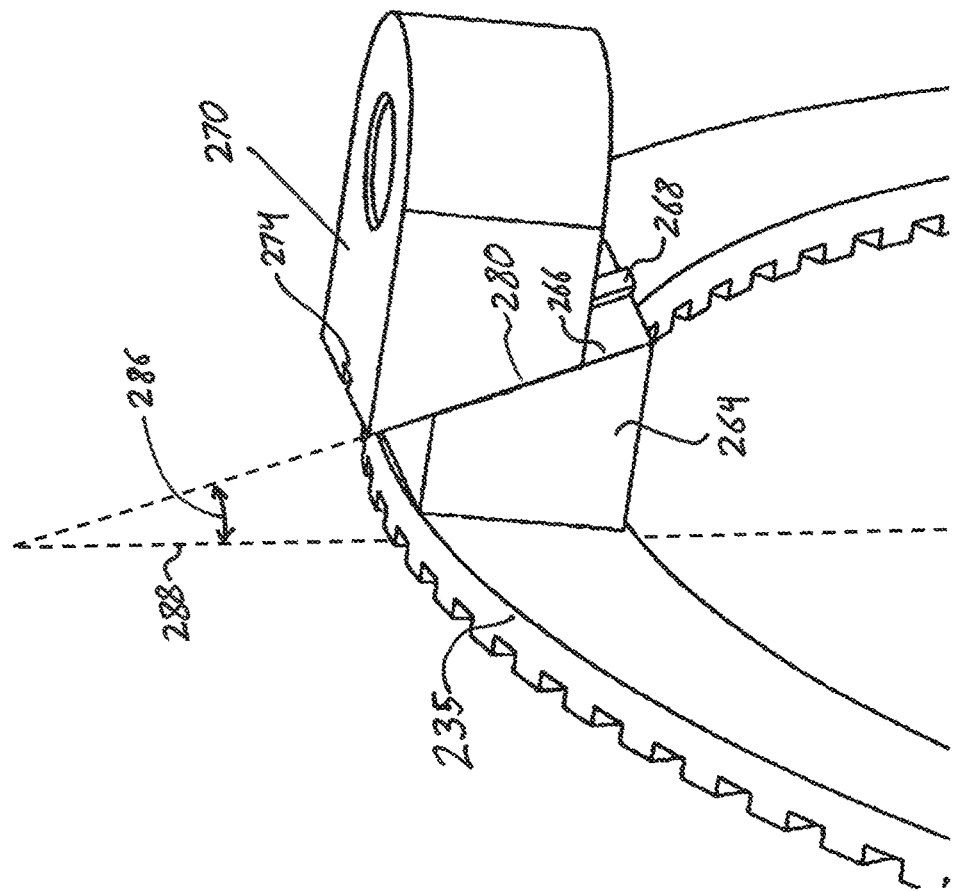
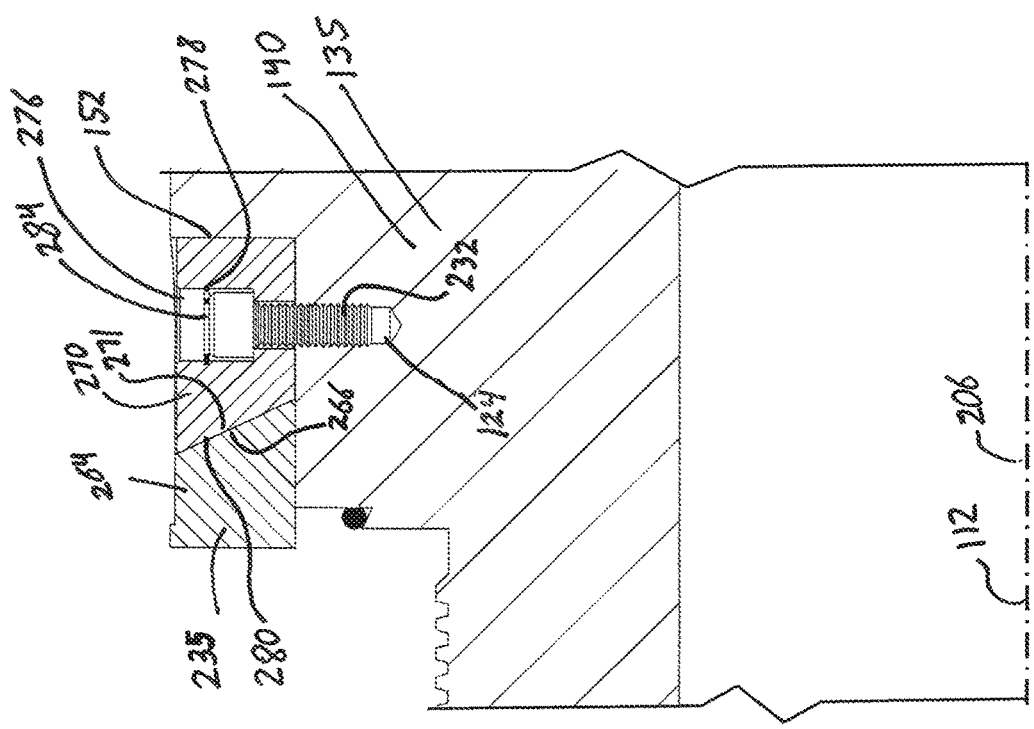

LOCKED CONNECTIONS BETWEEN TWO THREADED MEMBERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Field of the Disclosure

This disclosure relates generally to forming strings of multiple tubular members threaded end-to-end. More particularly, it relates to an apparatus, a system, and a method for forming locked connections between two threaded tubular members that are coupled end-to-end.

Background to the Disclosure

For the transport of fluids, such as in refineries, other process facilities, and in pipework used to transport fluids to and from a well, as examples, it is common to form strings of multiple tubular members (such as pipe segments, for example, and also referred to as "tubulars"). The tubulars are threaded together, end-to-end, forming a longer fluid-conveying system. In some situations, it is advantageous to lock-together the threaded couplings between pairs of adjacent tubular members to prevent disconnection in case the string is rotated opposite the direction of the threads. A conventional method for locking a threaded coupling is through "keying". This method involves fully screwing together two adjacent and axially aligned tubular members and then milling a connecting slot in the outside surface of the two mating tubular members, into which a "key" can be inserted, the key extending into both of the mating tubulars. This assembly prevents the mating tubulars from rotating independently of each other. After the two members are keyed, they become a customized pair, intended for use together. If instead the slots were milled into the individual tubular members independently of each other, it is unlikely that when fully threaded together the slots would line up to allow a key to be inserted into both slots. Further, if one of the keyed tubular members of a pair must be replaced, making the new tubular involves sending the other existing tubular to the manufacturer so that the key slot is milled in the correct orientation on the replacement tubular.

BRIEF SUMMARY OF THE DISCLOSURE

In a disclosed embodiment, there is a connection between first and second tubular members that each include an end portion with a shoulder. The connection includes a first and a second ring. The first ring includes an annular body with a first castellated surface and a plurality of tabs extending from the annular body. The second ring includes an annular body with a second castellated surface, and a plurality of tabs extending from the annular body. The annular body of the first ring is disposed adjacent the shoulder of the first tubular member, and the plurality of tabs of the first ring are coupled to the first tubular member. The annular body of the second ring is disposed adjacent the shoulder of the second tubular member, and the plurality of tabs of the second ring are coupled to the second tubular member. The second castellated surface is engaged with the first castellated surface.

The connection may include one or more keys, each configured to interconnect with the one of the plurality of tabs of the second ring to form a key joint. The key joint may include a boss formed on one of the tab and the key and a groove formed on the other of the tab and the key, wherein the boss and the groove interconnect to transfer axial force.

For the key joint, the boss may be a dove tail boss formed on a beveled end of the tab, and the groove may be a dove tail groove formed on a beveled end of the key.

The end of the first tubular member may be a threaded box end, and end of the second tubular member a threaded pin end. In some embodiments, the second ring is configured to engage and to disengage the first and second castellated surfaces while the box end and the pin end are threadingly engaged.

In another embodiment, apparatus for coupling a first tubular member to second tubular member comprises a first ring coupled to the first tubular member. The first ring includes a castellated annular first surface with teeth extending in first direction and also includes a first projection extending in a second direction opposite the first direction, the first projection having a beveled surface. A first recess in the first tubular member is configured to receive the first projection and includes a fastener-receiving bore. A key that is configured to be disposed in the first recess has a through-bore aligned with the fastener-receiving bore and has a beveled surface engaging the beveled surface of the first projection. A fastener is disposed in the through-bore and the fastener-receiving bore. The apparatus further includes a second castellated annular surface coupled to the second tubular member with teeth extending in the second direction and meshing with the teeth of the first castellated annual surface.

In some embodiments, the apparatus includes a second ring coupled to the second tubular member, wherein the second castellated annular surface is formed on the second ring. The second ring may further include a second projection extending from the second ring in the first direction, and there may be a second recess formed in the second tubular member, wherein the second projection is disposed in the second recess. In some embodiments, the first projection and the key are coupled via a dovetail connection. The some embodiments, the fastener includes a threaded portion that is disposed in the fastener-receiving bore, wherein the apparatus further includes a retainer that is fixed within the through-bore of the key and having an aperture, the aperture sized to prevent the fastener from passing through the aperture.

In another embodiment a method for coupling two aligned tubular members includes: coupling a first ring to a first end portion of a first tubular member, the first ring disposed adjacent a shoulder of the first end portion and including a first castellated surface; inserting a second ring onto a second end portion of a second tubular member, the second ring disposed adjacent a shoulder of the second end portion and including a second castellated surface; threading the first and second end portions together; engaging the first castellated surface with the second castellated surface; and coupling the second ring to the second tubular member.

In some embodiments, the method includes moving the second ring toward the shoulder of the second end portion by moving a key radially outward while slidingly engaging the key with a tab on the second ring. In some embodiments, the method may include moving the second ring away-from the shoulder of the second end portion by engaging slidingly a key with a tab on the second ring while moving the key radially inward and while coupling the key to the second tubular member. In some embodiments, the method includes engaging slidingly a key on a tab of the second ring prior to inserting the second ring onto the second end portion. In some embodiments, the method includes: engaging slidingly a key on a tab of the second ring; inserting a threaded fastener through the key; and threading the threaded fastener into the second tubular member.

Embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed exemplary embodiments, reference will now be made to the accompanying drawings:

FIG. 3 shows cross-sectional side view of one of the locking rings and a key coupled on the end portion of one of the tubular members of FIG. 1;

FIG. 4 shows a close, perspective view of the key partially installed on a tab of the locking ring of FIG. 3 in accordance with principles described herein;

NOTATION AND NOMENCLATURE

Figure 1:
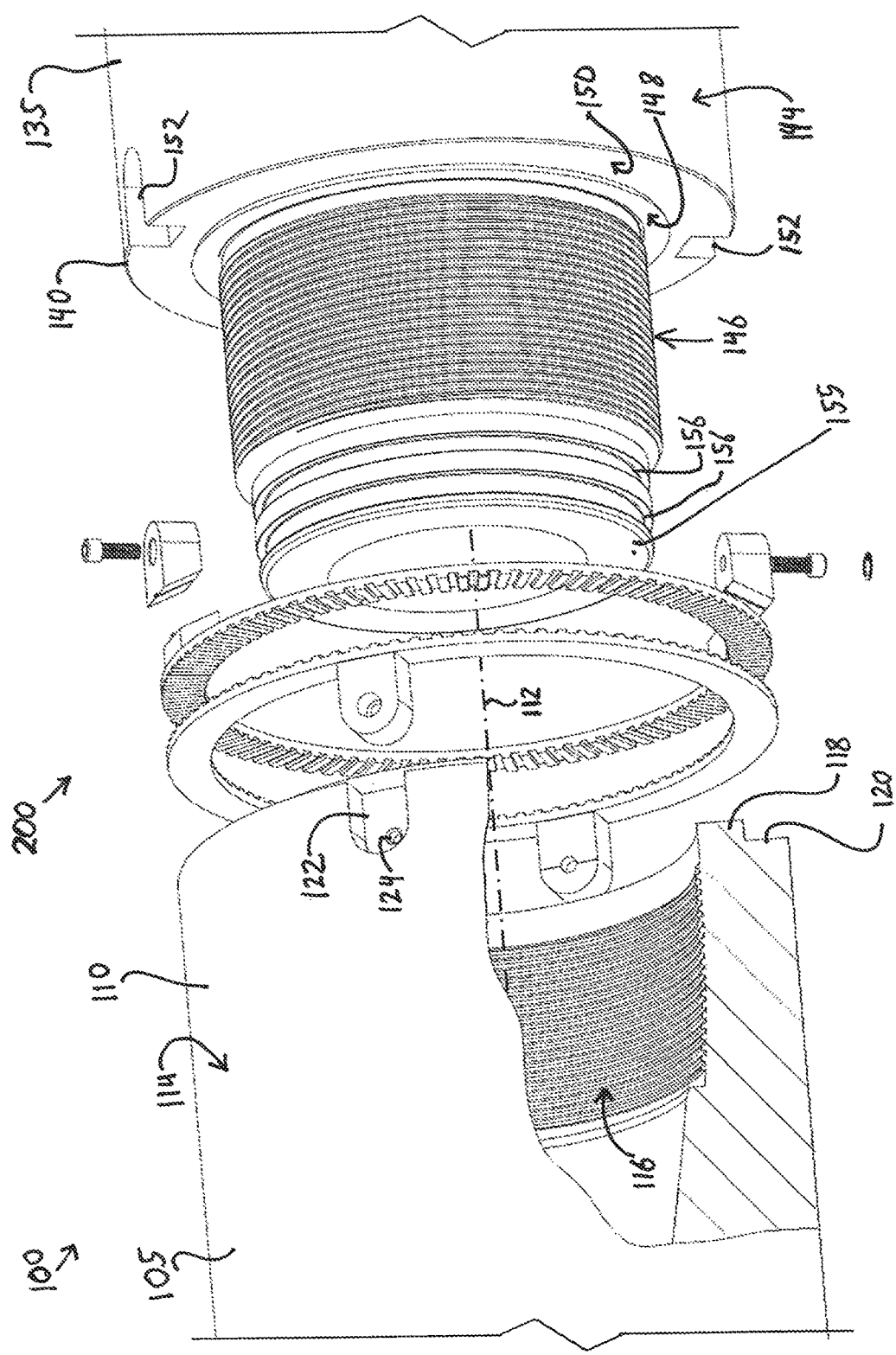
FIG. 1 shows an exploded, perspective view of an embodiment of a tubular connection that includes a locking ring apparatus having two locking rings disposed between end portions of two threaded members in accordance with principles described herein.

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The figures are not necessarily drawn to-scale. Certain features and components disclosed herein may be shown exaggerated in scale or in somewhat schematic form, and some details of conventional elements may not be shown in the interest of clarity and conciseness. In some of the figures, in order to improve clarity and conciseness, one or more components or aspects of a component may be omitted or may not have reference numerals identifying the features or components. In addition, within the specification, including the drawings, like or identical reference numerals may be used to identify common or similar elements.

As used herein, including in the claims, the terms "including" and "comprising," as well as derivations of these, are used in an open-ended fashion, and thus are to be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, then X may be based on Y and on any number of other factors. The word "or" is used in an inclusive manner. For example, "A or B" means any of the following: "A" alone, "B" alone, or both "A" and "B." In addition, when used herein including the claims, the word "substantially" means within a range of plus or minus 10%. When used herein including the claims, the word "uniform" is equivalent to the phrase "uniform or substantially uniform."

In addition, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis. Furthermore, any reference to a relative direction or relative position is made for purpose of clarity, with examples including "top," "bottom," "up," "upper," "upward," "down," "lower," "clockwise," "left," "leftward," "right," and "right-hand." For example, a relative direction or a relative position of an object or feature may pertain to the orientation as shown in a figure or as described. If the object or feature were viewed from another orientation or were implemented in another orientation, it may then be helpful to describe the direction or position using an alternate term.

As used herein, including the claims, the plural term "threads" broadly refer to a single, helical thread path, to multiple, parallel helical thread paths, or to portions of one or more thread paths, such as multiple troughs axially spaced-apart by crests.

DETAILED DESCRIPTION OF THE DISCLOSED EXEMPLARY EMBODIMENTS

Referring to the exploded view of FIG. 1, in an embodiment, a tubular connection 100 includes an end portion of a first threaded member 105, an end portion of a second threaded member 135, and a locking ring apparatus 200 having various members disposed on or between the end portions of threaded members 105, 135. Either or both tubular members 105, 135 may be, as examples, a pipe segment such as those to be connected end to end for the transport of fluids. In this example, the threaded members 105, 135 are threaded tubulars. Further, the end portion of tubular member 105 is a box end connector 110, and end portion of tubular member 135 is a pin end connector 140.

First tubular member 105 and its box end connector 110 extend along an axis 112 and include an external surface 114. Box end connector 110 may also be called box end 110. Box end 110 includes an internal, threaded surface 116, a torqueing shoulder 118, a receiving shoulder 120, and one or a plurality of recesses or keyways 122 extending axially from shoulder 120. A fastener-receiving bore 124 extends radially inward from each keyway 122. At least in this example, shoulder 120 is adjacent shoulder 118 and is radially exterior and axially recessed with respect to shoulder 118, and box end 110 includes two keyways 122, circumferentially-spaced by 180 degrees.

Second tubular member 135 and its pin end connector 140 include an external surface 144 and extend along an axis that is aligned with axis 112 in FIG. 1. Pin end connector 140 may also be called pin end 140. Pin end 140 includes an external, threaded surface 146, a torqueing shoulder 148, a receiving shoulder 150, and one or a plurality of recesses or keyways 152 extending axially from shoulder 150. As in keyway 122, a threaded hole (not shown in FIG. 1) extends radially inward from each keyway 152. At least in this example, shoulder 150 is adjacent shoulder 148 and is radially exterior and axially recessed with respect to shoulder 148, and pin end 140 includes two keyways 122, circumferentially-spaced by 180 degrees. One or a plurality of circumferential grooves 156 are formed between the terminal end 155 of the pin end and threaded surface 146 to receive annular seal members. In some embodiments, the threads of ends 105, 135 provide sealing without the inclusion of grooves 156 and their seal members.

Figure 2:
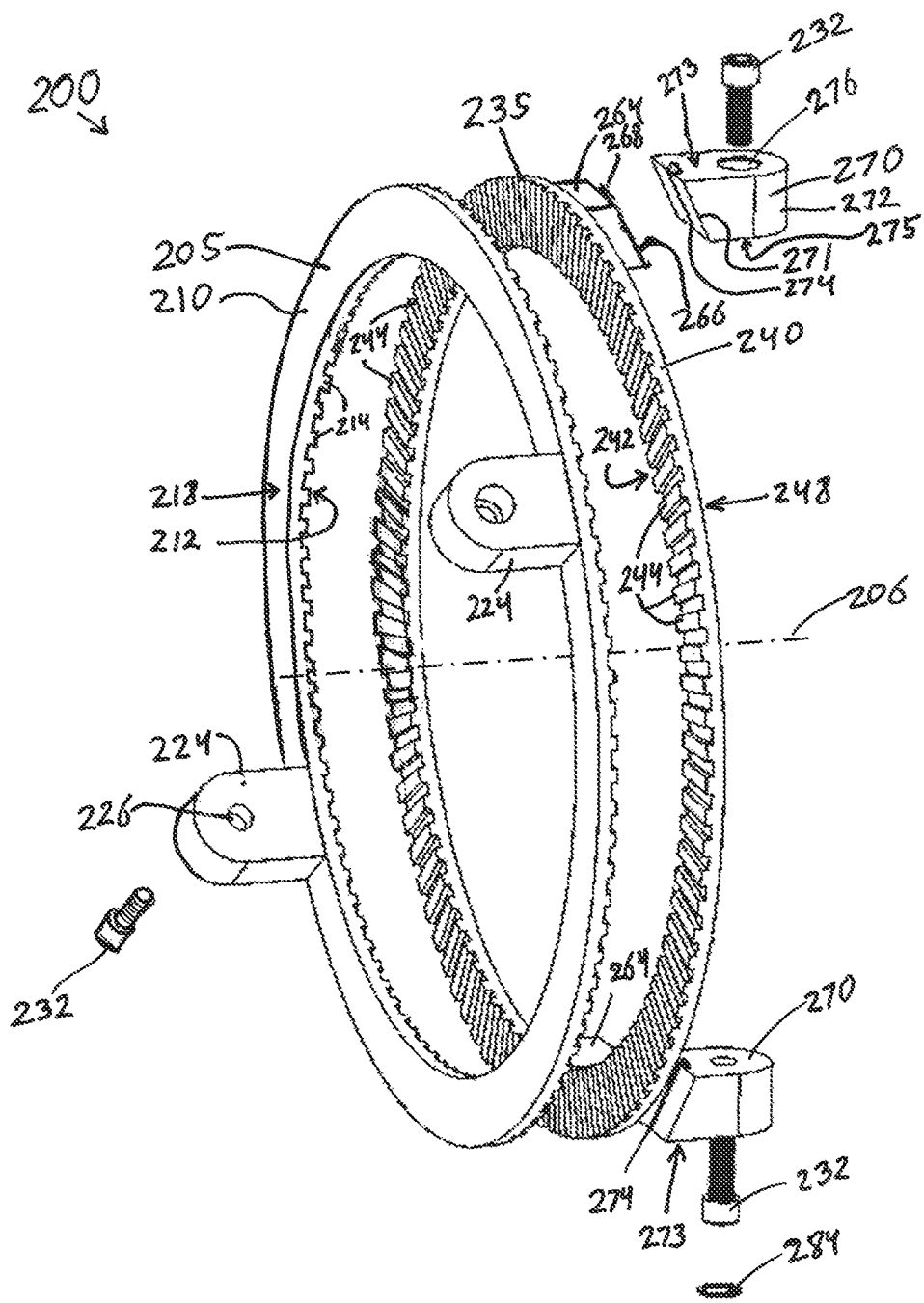
FIG. 2 shows a perspective view of the locking ring apparatus of FIG. 1.

Referring now to FIG. 2, in an embodiment, locking ring apparatus 200 includes a first locking ring 205 centered on an axis 206, a second locking ring 235, and one or a plurality of key members or keys 270 configured to engage second locking ring 235. First locking ring 205 includes an annular body 210 having a gear-toothed or castellated surface 212 generally perpendicular to axis 206, a generally flat rear surface 218 generally perpendicular to axis 206, and one or a plurality of projections or tabs 224 extending from rear surface 218. In this embodiment, surface 212 is a front surface, facing axially. Castellated surface 212 includes a plurality of radially extending troughs and crests, forming teeth 214. In FIG. 2, surface 212 includes ninety teeth 214, and ring 205 includes two tabs 224 located opposite each other, e.g. circumferentially 180 degrees apart along rear surface 218. Each tab 224 includes a countersunk through-bore 226 extending therethrough to receive a fastener 232, which includes a threaded portion and a tool-receiving head in this example.

In FIG. 2, second locking ring 235 is centered on axis 206 and includes an annular body 240 having a gear-toothed or castellated surface 242 generally perpendicular to axis 206, a generally flat rear surface 248 generally perpendicular to axis 206, and one or a plurality of projections or tabs 264 extending from rear surface 248. In this embodiment, surface 212 is a front surface, facing axially. Castellated surface 242 includes a plurality of radially extending troughs and crests, forming teeth 244. In FIG. 2, surface 242 includes ninety teeth 244, and ring 205 includes two tabs 264 located opposite each other, e.g. circumferentially 180 degrees apart along rear surface 248. The tabs 264 are positioned to be received in a keyway 152 of pin end 140. Each tab 264 terminates at a beveled face or end 266 that includes a dove tail boss 268 extending along a radially extending plane that includes central axis 206. Dove tail boss 268 may also be simply called dove tail 268. End 266, including dove tail 268, is beveled with respect to axis 206, configuring them as camming surfaces. In some embodiments, the number of teeth for each ring 205, 235 is selected from a range of 80 to 120, and in others, the number is selected from a range of 120-450. Locking rings 205, 235 may have more or fewer teeth 214, 244 than described in the previous examples, within practical limits of fabrication or strength.

Locking ring apparatus 200 includes one key 270 for each tab 264 of locking ring 235. Thus, this embodiment includes two keys 270. Each key 270 is generally rectangular but includes a beveled face or end 271 and a second end 272, which is rounded in this example. With respect to axis 206 when aligned as shown in FIG. 2, key 270 includes a radially outer surface 273 and a radially inner surface 275 extending between ends 271, 272. A dove tail groove 274 extends within beveled end 271 and through the surfaces 273, 275. End 271, including dove tail groove 274, is beveled with respect to axis 206, configuring them as camming surfaces. A countersunk through-bore 276 extends from surface 273 through key 270 to receive a fastener 232, which in this example, is threaded. Some embodiments of rings 205 may include more than two tabs 224, up to a practical limit. Some embodiments of ring 235 may include more than two tabs 264 and keys 270, up to a practical limit.

In the cross-sectional view of FIG. 3, key 270 is seated in keyway 152 of pin end 140 and interlocked with tab 264 of ring 235 along beveled ends 266, 271, which constitutes a key joint 280. A threaded fastener 232 is received in through-bore 276 and threaded into bore 124 of keyway 152. Fastener 232 is held loosely or snuggly within through-bore 276 of key 270 by a retainer 284 having an aperture, allowing access to the tool receiving head on fastener 232. Retainer 284 may be, as an example, an annular circlip or snap ring. For example, Key 270 includes an annular groove 278 formed within the larger diameter portion of through-bore 276 to receive the circlip or snap ring retainer 284. Snap ring 284 also configures fastener 232 to exert an outward force on key 270, away-from axis 112, when fastener 232 is rotated so as to unthread it from bore 124 in pin end 140. As used herein, including in the claims, the verb "unthread" may broadly refer to partially removing or detaching or fully removing or detaching one threaded member from another. Similarly, the verb "thread" may refer to partially installing or attaching or fully installing or attaching one threaded member with another. If a more specific meaning is intended (e.g. partially removed/installed or fully removed/installed) the context will make that meaning clear.

Referring now to FIG. 4, dove tail groove 274 of key 270 is slidingly engaged with dove tail 268 of tab 264 on ring 235 at key joint 280. In this view, key 270 is not aligned with tab 264 in the axial direction; rather, key 270 is partially installed or partially removed from tab 264. A bevel angle 286 measures the incline of ends 266, 271 with respect to a radial line 288. Angle 286 indicates the bevel or incline of ends 266, 271 and joint 280 with respect to the central axis of ring 235 (FIG. 2), from which line 288 extends. In this embodiment angle 286 is 25°+/−5° (i.e., 25 degrees plus or minus 5 degrees). In various other embodiments, angle 286 may be greater than 30° or less than 20°, within a practical limit based on the desired functionality of ring 235 and key 270. Functionality of ring 235 and key 270 is described below. When key 270 and tab 264 are interconnected at key joint 280, as shown in FIG. 4 and FIG. 3, they can transfer axial force between ring 235 and key 270.

Figure 5:
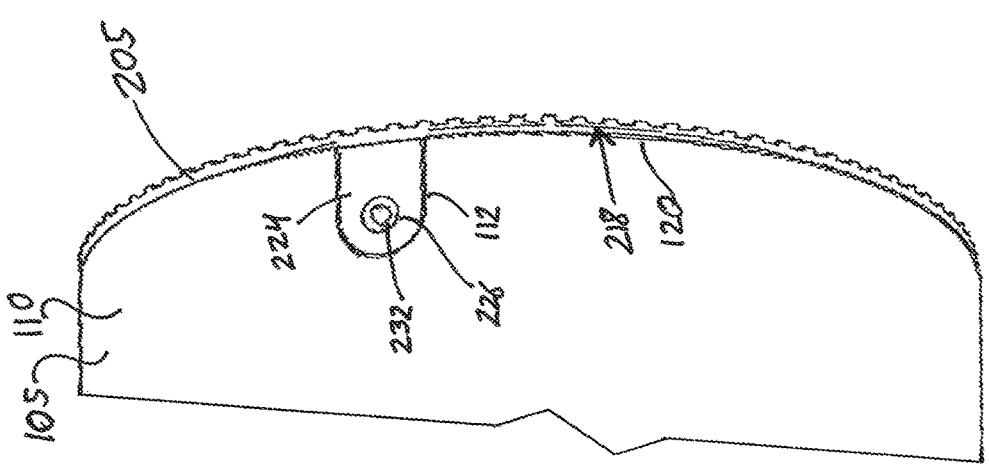
FIG. 5 shows a perspective view of the other locking ring coupled on the end portion of the other tubular member of FIG. 1.

FIG. 5 shows locking ring 205 coupled to box end 110 of the first tubular member 105. Rear surface 218 of annular body 210 is disposed adjacent the receiving shoulder 120 and, in this instance, is contacting shoulder 120. Tab 224 is disposed in a keyway 112 on box end 110. Tab 224 is coupled to box end 110 by a fastener 232 received in through-bore 226 and bore 124 (FIG. 1). The other tab or tabs 224 are to be similarly coupled. In FIG. 5, castellated front surface 212 faces away-from shoulder 120 and, more specifically, faces 180 degrees away-from shoulder 120.

Figure 6:
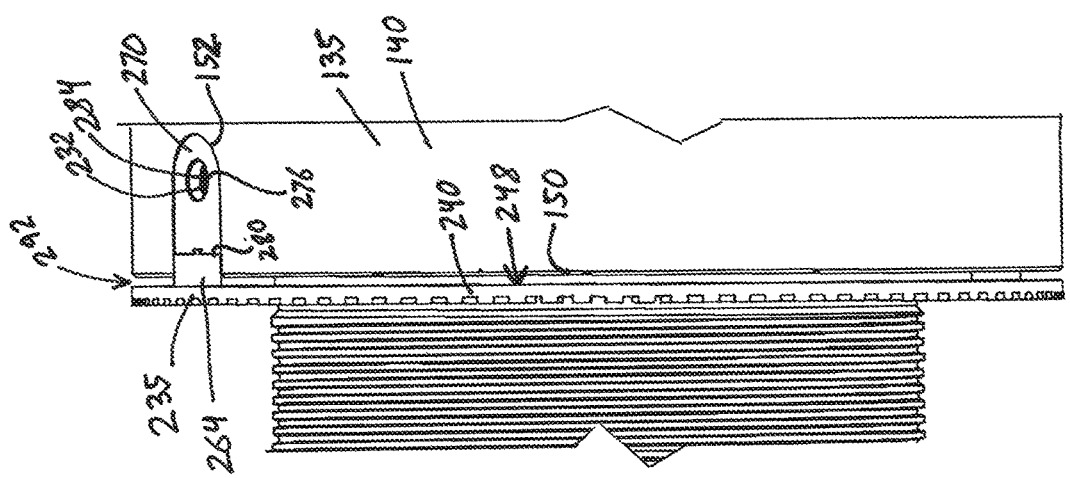
FIG. 6 shows a side view of the end portion of FIG. 3 having the locking ring and the key installed in a first configuration.

FIG. 6 shows locking ring 235 coupled to pin end 140 of the second tubular member 135. Key 270 and tab 264 and are coupled at joint 280 and are aligned in the axial direction. Key 270 and tab 264 are disposed in keyway 152 on pin end 140 with key 270 fully seated in keyway 152 and coupled to pin end 140 by a fastener 232 received in through-bore 276 and fully threaded into bore 124 (FIG. 3) of pin end 140. Snap ring 284 is also received in through-bore 276. Rear surface 248 of annular body 240 is axially adjacent the receiving shoulder 150 but is axially separated or spaced-apart from shoulder 150, leaving a gap 292 therebetween. The length of gap 292 is based on the combined length of key 270 and tab 264 when these two members are axially aligned, as shown. In FIG. 6, castellated front surface 242 faces away-from shoulder 150 and, more specifically, faces 180 degrees away-from shoulder 150. The other key or keys 270 and tab or tabs 264 are to be similarly coupled.

Figure 7:
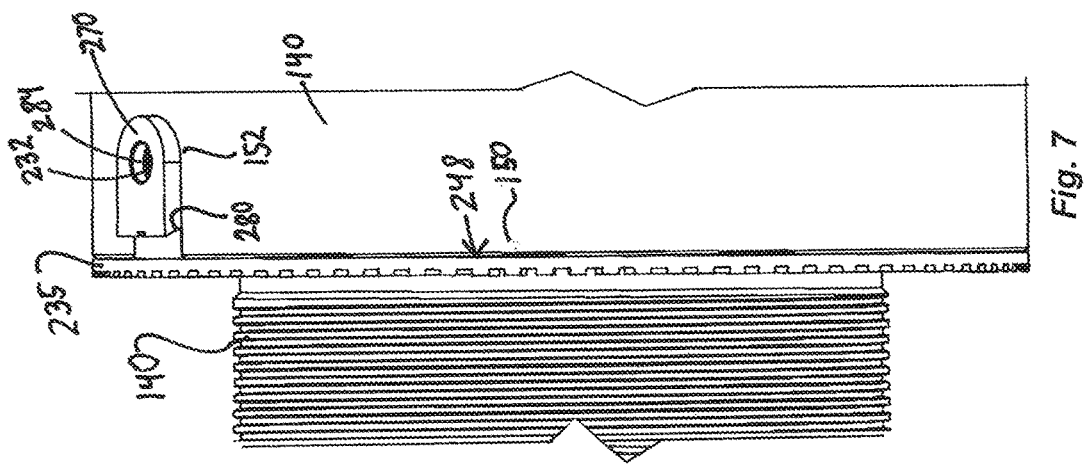
FIG. 7 shows a side view of the end portion of FIG. 3 having the locking ring and the key installed in a "retracted" configuration.

In FIG. 7, locking ring 235 is coupled to pin end 140 in a different configuration than in FIG. 6. In FIG. 7, key 270 is partially removed or retracted radially from keyway 152; and rear surface 248 of annular body 240 is axially retracted, being axially adjacent the receiving shoulder 150 and, in this instance, is contacting shoulder 150. Members 235, 140 lack the gap 292 of FIG. 6. The assembly of ring 235 and pin end 140 may be transitioned from the axially-separated configuration of FIG. 6 to the retracted configuration of FIG. 7 by unthreading or removing each fastener 232 partially from its bore 124 in pin end 140. The unthreading of a fastener 232 (e.g. transitioned from FIG. 6 to FIG. 7) causes the fastener to push against its snap ring 284, which pushes against the corresponding key 270, moving it radially outward. This can be done for each key 270. As a result of sliding engagement within the interlocking joint 280, the outward movement of keys 270 pulls the ring 235 axially toward shoulder 150, shrinking or removing the gap 292 of FIG. 6, potentially making the annular body 240 contact shoulder 150. Thus, through joint 280, a camming action of surfaces 266, 271 pulls locking ring 235 axially when dove tail groove 274 pulls against dove tail 268 (FIG. 4) on tab 264. Optionally, ring 235 and key 270 may be installed on pin end 140 in the "retracted" configuration of FIG. 7 without first being arranged in the configuration of FIG. 6.

Figure 8:
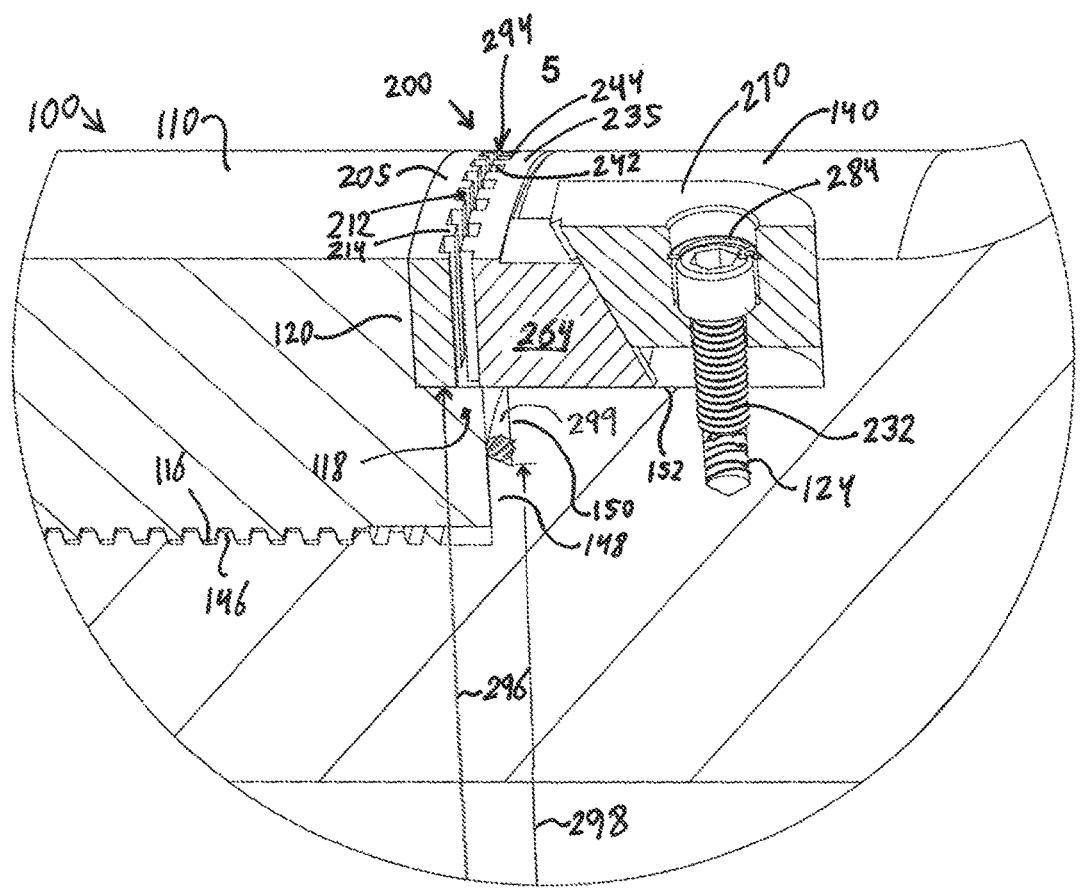
FIG. 8 shows a perspective view, partially in cross-section, of a partially assembled configuration of tubular connection of FIG. 1.

Referring now to the example of FIG. 8, fasteners 232 remain engaged with bore 124 after ring rear surface 248 contacts pin shoulder 150, and each key 270 moves no further outward due to the binding effect of its fastener 232. For such embodiments, to remove fasteners 232 further from pin end 140, retainer 284 would first be removed. The binding effect induced in part by retainer 284, keeps ring 235 and key 270 held together as a pair while installed on pin end 140.

Referring still to FIG. 8, a partially assembled configuration of tubular connection 100 is shown. Locking ring 205 is coupled to box end 110 in the configuration of FIG. 5, and locking ring 235 is coupled to pin end 140 in the retracted configuration of FIG. 7. In FIG. 8, box end 110 is threadingly received on pin end 140 so the threads of surfaces 116, 146 engage, and torqueing shoulders 118, 148 engage. These engaging surfaces and shoulders may be torqued together. A separation or gap 294 exists between the castellated surfaces 212, 242 of rings 205, 235 so that the teeth 214, 244 of these surfaces are not engaged and, in at least some instances, may be described as being disengaged. Receiving shoulder 120 on box end 110 has an inner diameter 296, and ring bodies 210, 240 share the same inner diameter 296 with sufficient clearance for sliding contact between ring bodies 210, 240 and the cylindrical, outer surface of shoulder 118 that intersects shoulder 120. The inner diameter of keyway 152 on pin end 140 is equal to diameter 296, and the inner diameter of tab 264 on ring 235 shares this same diameter but with sufficient clearance for sliding contact. Thus, in FIG. 8, second ring 235 is resting both on the radially outer surface of shoulder 118 and in keyway 152. The outer diameters of rings 205, 235 are generally equal to the outside diameters of box end 110 or pin end 140. Thus, for example, the radially outer surface of a ring 205, 235 may be flush, may extend beyond, or may be recessed below the radially outer surface of an end portion 110, 140 in various embodiments. The inner diameter 298 of receiving shoulder 150 is less than diameter 296 to provide space for a seal member 299 to be disposed between shoulders 118, 150, to engage sealing the end portions 140, 110.

Figure 9:
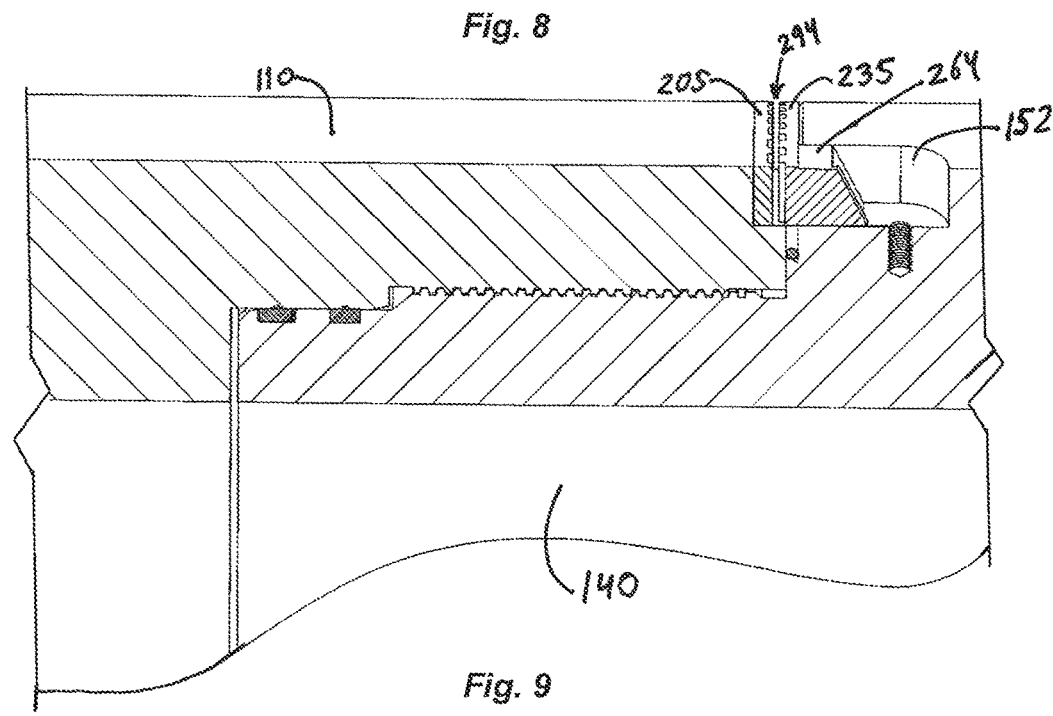
FIG. 9 shows a perspective view, partially in cross-section, of a partially assembled configuration of tubular connection of FIG. 1.

FIG. 9 shows a close view of another a preliminary, partially assembled configuration of tubular connection 100, similar to the configuration of FIG. 8. Box end 110 is threadingly received on pin end 140, as described above. Again in FIG. 9, locking ring 205 is coupled to box end 110, and locking ring 235 is coupled to or received on pin end 140 in a retracted configuration, resulting in a separation or gap 294 between castellated surfaces 212, 242 and their teeth 214, 244, which are not engaged. However, no key 270 is installed in keyway 152, and no key 270 engages tab 264. The other keyway(s) 270 and key(s) 264 have the same configuration. The configuration of FIG. 9 may be achieved, for example, by installing ring 235 on pin end 140 without first attaching any keys 270 to tabs 264.

Figure 10:
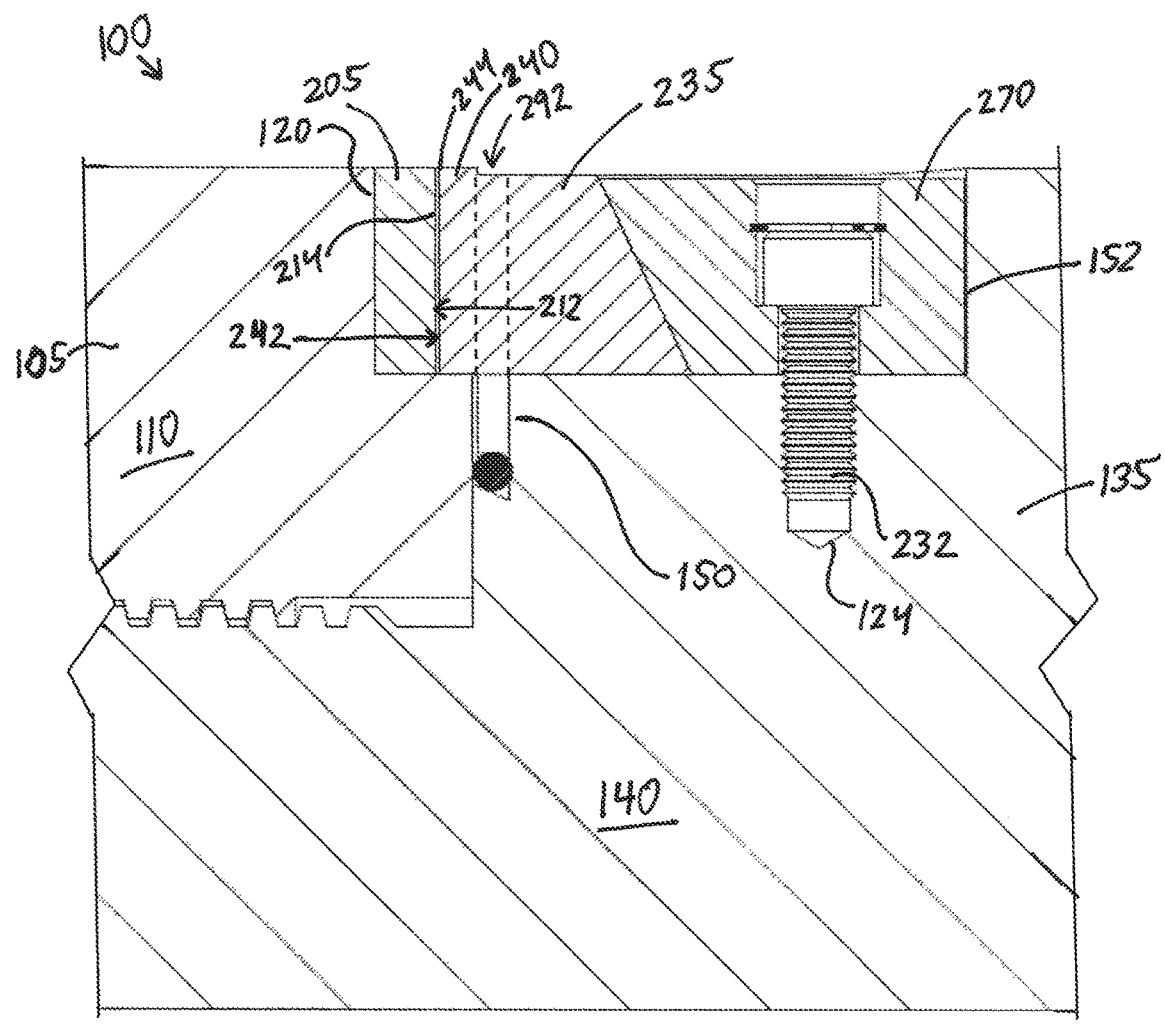
FIG. 10 shows a side view, partially in cross-section, of a fully assembled configuration of the tubular connection of FIG. 8.

FIG. 10 shows a close-up view of tubular connection 100 fully assembled for operation. Locking ring 205 is coupled to box end 110 like the configuration of FIG. 5, and locking ring 235 is coupled to pin end 140. In FIG. 10, key 270 is fully seated in keyway 152 of tubular member 135 and fastener 232 is tightened or fully threaded into bore 124 (e.g. as far as possible or practical). The other key(s) 264 are similarly coupled to tubular member 135 such that locking ring 235 (e.g. annular body 240) is displaced axially from shoulder 150, resulting in a gap 292, like the gap in FIG. 6. In FIG. 10, gap 292 is shown by hidden lines. Teeth 244 of locking ring 235 engage teeth 214 of locking ring 205. During assembly, the seating of keys 270 and the resulting engagement of teeth 214, 244 on surfaces 212, 242 are anticipated to occur after end portions 110, 140 are threaded together, possibly tightened, possibly torqued to a specified value. In some instances, it may be advantageous to back-off (partially unthread) the threads of end portions 110, 140 slightly after they are tightened, allowing teeth 214, 244 to align for engagement. In some instances, it may be advantageous to tighten the threads of end portions 110, 140 further in order to align teeth 214, 244. As an example, the configuration of FIG. 10 may achieved from the configuration of FIG. 8 by coupling keys 270 completely or more completely into pin end 140 using fasteners 232, which involves a camming action of surfaces 266, 271 whereby key 270 pushes axially against tab 264.

Thus, in connection 100, annular body 210 of the first locking ring 205 is disposed axially adjacent, possibly touching, the receiving shoulder 120 of tubular member 105, and tab 224 couples to the first tubular member 105 (FIG. 5). Annular body 240 of the second locking ring 235 is disposed adjacent the receiving shoulder 150 of the second tubular member 135, albeit with gap 292 therebetween, and tab 264 is coupled to tubular member 135 through key 270 and key joint 280, resulting in the engagement of castellated surfaces 212, 242. The number of teeth 214, 244 on the locking rings influences the ease with which the surfaces 212, 242 engage after tubular members 105, 135 are threaded together. Having more teeth 214, 244 means that surfaces 212, 242 are able to engage with the aid of smaller unthreading or smaller threading movements of tubular members 105, 135 or with no relative movement between tubular members 105, 135.

Figure 11:
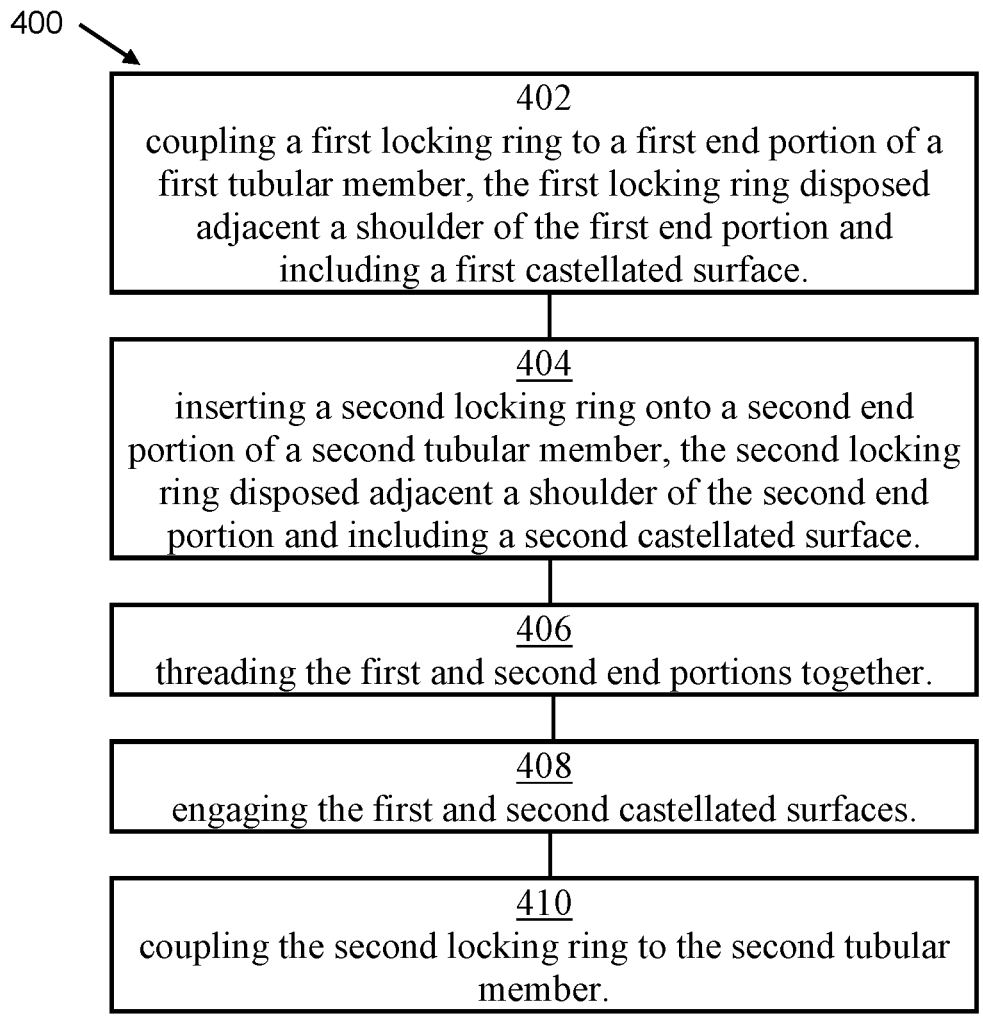
FIG. 11 shows a flow diagram of a method for connecting two tubular members in accordance with principles disclosed herein.

FIG. 11 shows a method 400 for connecting two tubular members in accordance with principles described herein. Method 400 may be applied, for example, to tubular connection 100 of FIG. 1. At block 402, method 400 includes coupling a first locking ring to a first end portion of a first tubular member, the first locking ring disposed adjacent a shoulder of the first end portion and including a first castellated surface. For example, in FIG. 5, locking ring 205 is received on box end 110 on tubular member 105 with annular body 210 parallel to and close to or contacting the adjacent shoulder 120, and fasteners 232 couple ring 205 to box end 110.

Block 404 includes inserting a second locking ring onto a second end portion of a second tubular member, the second locking ring disposed adjacent a shoulder of the second end portion and including a second castellated surfaces. For example, in FIG. 6, locking ring 235 is received on pin end 140 of tubular member 135 with annular body 240 parallel to and spaced-apart from the adjacent shoulder 150. As another example, in FIG. 7, locking ring 235 is received on pin end 140 of tubular member 135 with annular body 240 parallel to and close to or contacting the adjacent shoulder 140.

Block 406 includes threading the first and second end portions together. FIG. 8 and FIG. 9 provide examples, each having a box end 110 threadingly coupled to a pin end 140.

Block 408 includes engaging the first and second castellated surfaces. As an example, block 408 may be achieved by transitioning from the configuration of FIG. 8 to the configuration of FIG. 10 by threading the fasteners 232 that extend through keys 270 fully (e.g. as far as possible or practical) into holes 124 in pin end 140, which causes keys 270 to push axially against tabs 264 so castellated surfaces 212, 242 engaged causing teeth 244 to intermesh with teeth 214. For at least the disclosed embodiments, engaging the first and second castellated surfaces is performed after threading the first and second end portions together.

Block 410 includes coupling the second locking ring to the second tubular member. In some instances, block 410 occurs before threading the first and second end portions together in block 406 This may be accomplished, for example, by slidingly engaging keys 270 with corresponding tabs 264 on ring 235, forming key joints 280, like the key joint 280 shown in FIG. 4; by installing ring 235 on pin end 140 so tabs 264 are in or adjacent the keyways 152; and by threadingly engaging fasters 232 through keys 270 and into pin end 140, achieving the configuration of FIG. 6 or FIG. 7. If initially achieving the configuration of FIG. 6, the method may include unthreading the fastener 232 partially from pin end 140, pulling the ring 235 axially toward or against shoulder 150 to achieve the configuration of FIG. 7, as described above. After achieving the configuration of FIG. 6 or FIG. 7, block 406 may be accomplished: threading the first and second end portions together, and block 408 may be accomplished: engaging the first and second castellated surfaces.

In some other instances, the coupling operation of block 410 is accomplished after threading the first and second end portions together in block 406. This operation includes, for example, sliding ring 235 on pin end 140 and threading end portions 110, 140 together before fasteners 232 couple ring 235 to pin end 140. This operation may be exemplified by FIG. 9, wherein a key 270 and fastener 232 are absent and may be installed later to achieve the configurations of FIG. 8 and FIG. 10. Optionally, keys 270 may be slidingly received on tabs 264 of ring 235 (e.g., starting with FIG. 4) and installed together into slots 152 on pin end 140, but end portions 110, 140 would be threaded together before using fasteners 232 to couple ring 235 to pin end 140.

Various embodiments of method 400 may include fewer operations than described, and other embodiments of method 400 include additional operations.

Although each castellated surface 212, 242 was shown to be perpendicular to central axes 206 and facing away-from a receiving shoulder 120, 150, in some embodiments, surfaces 212, 242 have another shape or orientation, being, as examples, beveled or curved with respect to axes 206. In some embodiments, one or both rear surfaces 218, 248 and the corresponding recessed shoulders 120, 150 may be, as examples, perpendicular, beveled, or curved with respect to axis 206. In various embodiments, rear surface 218 is not parallel to surface 212, or rear surface 248 is not parallel to surface 242.

In some embodiments, castellated locking rings 205 235 are swapped such that a pin end or another tubular member includes keyway(s) 122 and is configured to receive a ring 205 coupled by tab(s) 224, and a box end or another tubular member includes keyway(s) 152 and is configured to receive ring 235 coupled by key(s) 270. In some embodiments, castellated surface 212 is formed directly on shoulder 120 of box end 110 or on shoulder 150 of pin end 140, and ring 235 with castellated surface 242 is coupled to the opposite tubular member, e.g. coupled to pin end 140 or box end 110. Castellated ring 235 again has the capability of being moved and engaged axially by the camming action of a key.

While exemplary embodiments have been shown and described, modifications thereof can be made by one of ordinary skill in the art without departing from the scope or teachings herein. The embodiments described herein are exemplary only and are not limiting. Many variations, combinations, and modifications of the systems, apparatuses, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily mean that the particular step or operation is necessary to the method. The steps or operations of a method listed in the specification or the claims may be performed in any feasible order, except for those particular steps or operations, if any, for which a sequence is expressly stated. In some implementations two or more of the method steps or operations may be performed in parallel, rather than serially.

What is claimed is:

1. A connection between a first tubular member and a second tubular member, the connection comprising:
   a first ring including
      an annular body with a first castellated surface and;
      a plurality of tabs extending from the annular body; and
   a second ring including
      an annular body with a second castellated surface; and
      a plurality of tabs extending from the annular body;
   wherein the first and second tubular members each include an end portion with a shoulder;
   wherein the annular body of the first ring is disposed adjacent the shoulder of the first tubular member, and the plurality of tabs of the first ring are coupled to the first tubular member;
   wherein the annular body of the second ring is disposed adjacent the shoulder of the second tubular member, and the plurality of tabs of the second ring are coupled to the second tubular member;
   wherein the second castellated surface is engaged with the first castellated surface, the connection further comprising:
   one or more keys, each key configured to interconnect with the one of the plurality of tabs of the second ring to form a key joint, each key joint including:
   a boss formed on the other of the tab and the key; and
   a groove formed on the other of the tab and the key;
   wherein the boss and the groove interconnect to transfer axial force.

2. The connection of claim 1 wherein for each key joint, the boss is a dove tail boss formed on a beveled end of the tab; and
   wherein for each key joint, the groove is a dove tail groove formed on a beveled end of the key.

3. The connection of claim 1 wherein the end of the first tubular member is a threaded box end, and the end of the second tubular member is a threaded pin end; and
   wherein the second ring is configured to engage and to disengage the first and second castellated surfaces while the box end and the pin end are threadingly engaged.

4. The connection of claim 1 wherein the first castellated surface faces 180 degrees away-from the shoulder of the first end portion; and
   wherein the second castellated surface faces 180 degrees away-from the shoulder of the second end portion.

5. Apparatus for coupling a first tubular member to a second tubular member comprising:
   a first ring coupled to the first tubular member and having a first castellated annular surface with teeth extending in first direction and having a first projection extending in a second direction opposite the first direction, the first projection having a beveled surface;
   a first recess in the first tubular member configured to receive the first projection and having a fastener-receiving bore;
   a key configured to be disposed in the first recess, the key having a through-bore aligned with the fastener-receiving bore and having a beveled surface engaging the beveled surface of the first projection;
   a fastener disposed in the through-bore and the fastener-receiving bore; and
   a second castellated annular surface coupled to the second tubular member with teeth extending in the second direction and meshing with the teeth of the first castellated annual surface.

6. The apparatus of claim 5 wherein the first castellated surface of the first ring comprises a plurality of teeth and wherein the first ring comprises a plurality of projections extending in the second direction opposite the first direction; and
   wherein the plurality of teeth of the first ring are greater in number than are the plurality of projections.

7. The apparatus of claim 5 wherein the number of teeth of the first castellated annular surface is between 80 and 450.

8. The apparatus of claim 5 wherein one of the beveled surface of the projection and the beveled surface of the key comprises a boss, and wherein the other beveled surface comprises a groove, and wherein the boss is disposed within the groove.

9. The apparatus of claim 5 further comprising a second ring coupled to the second tubular member, wherein the second castellated annular surface is formed on the second ring.

10. The apparatus of claim 9 further comprising a second projection extending from the second ring in the first direction, and a second recess formed in the second tubular member, the second projection being disposed in the second recess.

11. The apparatus of claim 5 wherein the first projection and the key are coupled via a dovetail connection.

12. The apparatus of claim 5 wherein the fastener includes a threaded portion that is disposed in the fastener-receiving bore, and further comprising a retainer fixed within the through-bore of the key and having an aperture, the aperture sized to prevent the fastener from passing through the aperture.

13. A method for coupling or decoupling two aligned tubular members, the method comprising:
   coupling a first ring to a first end portion of a first tubular member, the first ring disposed adjacent a shoulder of the first end portion and including a first castellated surface;
   inserting a second ring onto a second end portion of a second tubular member, the second ring disposed adjacent a shoulder of the second end portion and including a second castellated surface;
   threading the first and second end portions together;
   engaging the first castellated surface with the second castellated surface; and
   coupling the second ring to the second tubular member; and
   moving the second ring toward the shoulder of the second end portion by moving a key radially outward while slidingly engaging the key with a tab on the second ring.

14. The method of claim 13 wherein coupling the second ring to the second tubular member occurs before threading the first and second end portions together.

15. The method of claim 13 wherein moving the second ring toward the shoulder of the second end portion comprises:
   unthreading partially a threaded fastener from the second tubular member.

16. The method of claim 13 further comprising:
   moving the second ring away from the shoulder of the second end portion by engaging slidingly a key with a tab on the second ring while moving the key radially inward and while coupling the key to the second tubular member.

17. The method of claim 16 wherein moving the second ring way from the shoulder of the second end portion causes the first and second castellated surfaces to engage.

18. The method of claim 13 further comprising:
engaging slidingly a key on a tab of the second ring prior to inserting the second ring onto the second end portion.

19. The method of claim 13 wherein coupling the second ring to the second tubular member comprises:
engaging slidingly a key on a tab of the second ring;
inserting a threaded fastener through the key; and
threading the threaded fastener into the second tubular member.

* * * * *